United States Patent Office 2,840,580
Patented June 24, 1958

2,840,580

9α-HYDROXY STEROIDS

David Perlman, Princeton, James D. Dutcher and Josef Fried, New Brunswick, N. J., and Elwood O. Titus, Kensington, Md., assignors to Olin Mathieson Chemical Corporation, New York, N. Y., a corporation of Virginia No Drawing. Application May 24, 1957
Serial No. 661,309

2 Claims. (Cl. 260—397.45)

This application is a continuation-in-part of our parent application Serial No. 283,122, filed April 18, 1952, and now abandoned.

This invention relates to, and has for its object, the provision of 9α-hydroxy-Compound S [Δ⁴-pregnene-9α,17α,21-triol-3,20-dione] and 21-esters thereof, steroids of the general formula

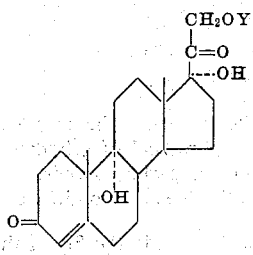

wherein Y is hydrogen or acyl (particularly the acyl radical of a hydrocarbon carboxylic acid having less than ten carbon atoms).

The steroids of this invention are physiologically active substances which possess glucocorticoid activity. Hence they can be used in lieu of hydrocortisone, for example, in the treatment of rheumatoid arthritis, for which purpose they are administered in the same manner as hydrocortisone with dosage adjusted for the relative activity of the particular steroid.

9α-hydroxy-Compound S is prepared by subjecting Compound S (or a 21-ester thereof) to the action of enzymes of the microorganism *Streptomyces aureofaciens* under oxidizing conditions. The oxidation can best be effected by either including the steroid in the aerobic culture of the microorganism, or by bringing together in an aqueous medium the steroid, air and enzymes of non-proliferating cells of the microorganism.

In general, the conditions of culturing *Streptomyces aureofaciens* for the purposes of this invention are (except for the inclusion of the steroid to be converted) the same as those of culturing various other *Streptomyces* for the production of antibiotics and/or vitamin $B_{12}$, i. e. the microorganism is aerobically grown in contact with (in or on) a suitable fermentation medium. A suitable medium essentially comprises a source of carbon and energy. The latter may be a carbohydrate (such as sucrose, molasses, glucose, maltose, starch or dextrin), a fatty acid, a fat (such as soybean oil) and/or the steroid itself. Preferably, however, the medium includes an assimilable source of carbon and energy in addition to the steroid.

The source of nitrogenous factors may be organic (e. g., soybean meal, corn steep liquor, meat extract and/or distiller's solubles) or synthetic (i. e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period or included in the medium prior to sterilization or inoculation. The preferred range of concentration of the steroid in the culture is about 0.01 to 0.10%. The culture period may vary considerably, the range of about 6 to 96 hours being feasible, but not limiting.

The process yields, inter alia, 9α-hydroxy-Compound S, which can, if desired, be esterified by treatment with the desired acid anhydride or acyl halide in an organic solvent (preferably an organic base such as pyridine) to yield the corresponding 21-ester derivative. The preferred acylating agents are those of hydrocarbon carboxylic acids of less than ten carbon atoms, as exemplified by the acid anhydrides or acyl chlorides of the lower alkanoic acids (e. g., acetic, propionic and enanthic acid), the monocyclic aromatic carboxylic acids (e. g., benzoic and o, m, or p-toluic acid), the monocyclic aralkanoic acids (e. g., α-toluic and β-phenylpropionic acid), the lower alkenoic acids, the lower cycloalkane carboxylic acids and the lower cycloalkene carboxylic acids.

The following examples illustrate the process of this invention:

EXAMPLE 1

9α-hydroxy-Compound S (a) FERMENTATION

An aqueous medium of the following composition is prepared:

| | | |
|---|---|---|
| Soybean meal | g | 15 |
| Glucose | g | 10 |
| $Co(NO_3)_2 \cdot 6H_2O$ | g | 0.005 |
| Soybean oil | ml | 2.2 |
| Reichstein's Compound "S" acetate | g | 0.2 |
| Water | liter | 1 |

One hundred-milliliter portions of the medium are distributed in fifty 500-ml. Erlenmeyer flasks, and the flasks are plugged with cotton and sterilized in the usual manner (by autoclaving). When cool, each of the flasks is inoculated with 3 ml. of a vegetative inoculum of *Streptomyces aureofaciens* NRRL 2209 which has been grown for 48 hours on a soybean meal-glucose medium. The flasks are then placed on a reciprocating shaker (120 four-inch cycles per minute), and agitation as well as aeration is allowed to proceed at 24–25° C. for five days. The contents of the flasks are pooled and, after the pH of the whole culture is adjusted to 3–4 with $H_2SO_4$, the solids are removed by centrifugation. The aqueous fraction is then extracted three times with an equal volume of chloroform. The chloroform is removed by evaporation under vacuum, leaving a residue of the solid oxidation products (usually containing some lipid material and unoxidized steroid from the culture medium as impurities).

(b) ISOLATION

The crude oxidation products are dissolved in 25 ml. of 80% aqueous methanol and extracted three times with 25-ml. portions of hexane. The methanol solution remaining is diluted with an equal volume of water, then extracted three times with 25-ml. portions of chloroform. This chloroform extract is then dried over anhydrous sodium sulfate and chromatographed over a column of silica gel (Davison No. 923) and eluted first with chloroform, then successively with chloroform containing 5, 10, 15 and 20% acetone. The material eluted with (1) chloroform and (2) chloroform containing 5% acetone is found to be essentially Reichstein's "S." The material eluted with chloroform containing 10 or more percent acetone, when subjected to paper chromatography, is found to contain components having essentially the same or slower mobility than cortisone, thus indicating microbiological oxidation. The fractions obtained by elution with chloroform containing 10% acetone and chloroform containing 15% acetone are active in the liver glycogen test of Venning et al. [Endocrinology, 38, 79 (1946)]. Test with sulfuric acid gives a yellow-green fluorescence characteristic of cortisone and hydrocortisone. 9α-hydroxy-Compound S is isolated as a crystalline component of the chloroform + 15% acetone eluate. It has the following properties: M. P. (Block) about 218–220° C., after softening at about 204° C.; $[\alpha]_D +120°$ (c, 0.15 in ethanol).

*Analysis.*—Calculated for $C_{21}H_{30}O_5$: C, 69.59; H, 8.34. Found: C, 69.19; H, 8.09.

EXAMPLE 2

(a) FERMENTATION

An aqueous medium of the following composition is prepared:

| | |
|---|---|
| Glycine _____ g__ | 2.6 |
| Sodium acid glutamate _____ g__ | 2.2 |
| Soybean oil _____ g__ | 2.2 |
| $K_2HPO_4 \cdot 3H_2O$ _____ g__ | 0.5 |
| $MgSO_4 \cdot 7H_2O$ _____ g__ | 0.5 |
| $FeSO_4 \cdot 7H_2O$ _____ g__ | 0.025 |
| $ZnSO_4 \cdot 7H_2O$ _____ g__ | 0.03 |
| $Co(NO_3)_2 \cdot 6H_2O$ _____ g__ | 0.005 |
| $CuSO_4 \cdot 5H_2O$ _____ g__ | 0.016 |
| $MnSO_4 \cdot 4H_2O$ _____ g__ | 0.012 |
| $CaCl_2 \cdot 2H_2O$ _____ g__ | 0.05 |
| Reichstein's Compound "S" acetate _____ g__ | 0.2 |
| Water _____ liter__ | 1 |

The procedure of Example 1(a) is followed except that the above-described medium is used in place of that given in Example 1. In addition to the desired oxidation products, about 0.15 μg./ml. of vitamin $B_{12}$ is present in the culture filtrate.

(b) ISOLATION

Following the procedure of Example 1(b), but using a batch of oxidized products obtained as described in Example 2(a), substantially the same results are obtained.

Analysis of the crystalline component isolated from the chloroform + 15% acetone eluate gives 9α-hydroxy-Compound S, having the following properties: M. P. (Block) about 218–220° C., after softening at about 204° C.; $[\alpha]_D^{23} +120°$ (c, 0.15 in ethanol).

*Analysis.*—Calculated for $C_{21}H_{30}O_5$: C, 69.59; H, 8.34. Found: C, 69.51; H, 8.09.

The invention may be otherwise variously embodied within the scope of the appended claims.

What is claimed is:
1. A steroid of the general formula

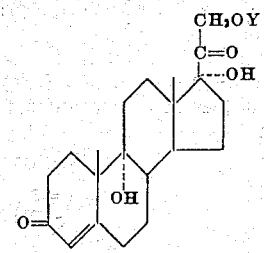

wherein Y is selected from the group consisting of hydrogen and the acyl radical of a hydrocarbon carboxylic acid of less than ten carbon atoms.

2. Δ⁴-pregnene-9α,17α,21-triol-3,20-dione.

References Cited in the file of this patent

UNITED STATES PATENTS 2,437,564    Serini et al. _____ Mar. 9, 1948